United States Patent
Kikin-Gil et al.

(10) Patent No.: US 10,592,091 B2
(45) Date of Patent: Mar. 17, 2020

(54) DRAG AND DROP OF OBJECTS TO CREATE NEW COMPOSITES

(71) Applicant: Microsoft Technology Licensing, LLC, Redmond, WA (US)

(72) Inventors: Erez Kikin-Gil, Bellevue, WA (US); Anav Silverman, Sammamish, WA (US); Suzan Marashi, Seattle, WA (US); David Lee, Sammamish, WA (US); Christopher Jung, Seattle, WA (US); Stephanie Sharp, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 15/786,140

(22) Filed: Oct. 17, 2017

(65) Prior Publication Data
US 2019/0114047 A1    Apr. 18, 2019

(51) Int. Cl.
*G06F 3/048* (2013.01)
*G06F 3/0486* (2013.01)
*G06F 3/0484* (2013.01)
*G06T 11/60* (2006.01)

(52) U.S. Cl.
CPC ........ *G06F 3/0486* (2013.01); *G06F 3/04842* (2013.01); *G06F 3/04847* (2013.01); *G06T 11/60* (2013.01)

(58) Field of Classification Search
CPC .......... G06F 3/00; G06F 3/048; G06F 3/0482; G06F 3/0484; G06F 3/0486; G06F 3/04847; G06F 3/04842
See application file for complete search history.

(56) References Cited

U.S. PATENT DOCUMENTS

| | | | |
|---|---|---|---|
| 7,337,409 B2 | 2/2008 | Doblmayr et al. | |
| 8,793,605 B2 | 7/2014 | Szeto | |
| 9,098,183 B2 | 8/2015 | Vonshak et al. | |
| 9,251,763 B2 | 2/2016 | Shetterly et al. | |
| 9,507,506 B2 | 11/2016 | Grosz et al. | |
| 2003/0001895 A1 | 1/2003 | Celik | |
| 2007/0150834 A1 | 6/2007 | Muller et al. | |
| 2009/0276701 A1 | 11/2009 | Nurmi | |

(Continued)

OTHER PUBLICATIONS

"International Search Report and Written Opinion Issued In PCT Application No. PCT/US2018/048656", dated Nov. 16, 2018, 12 Pages.

*Primary Examiner* — Xiomara L Bautista

(57) ABSTRACT

Non-limiting examples of the present disclosure describe automatic creation of a composite data object from a received drag and drop action. A drag and drop action is received through a user interface of a productivity service. The drag and drop action is analyzed, where an analysis comprises: evaluation of attributes of data objects of the drag and drop action, evaluation of a relationship between the data objects and a determination of user intent for the drag and drop action based on a placement of the first data object onto a position of the second data object. A group type is created that comprises an arrangement of the first data object and the second data object based on the analysis of the drag and drop action. A representation of a composite data object is surfaced, through the user interface, based on the created group type.

20 Claims, 12 Drawing Sheets

(56) References Cited

U.S. PATENT DOCUMENTS

| | | |
|---|---|---|
| 2010/0050101 A1 | 2/2010 | Baik et al. |
| 2015/0177925 A1 | 6/2015 | Villaron |
| 2016/0092096 A1 | 3/2016 | Matas et al. |
| 2017/0285901 A1 | 10/2017 | Demaris et al. |
| 2018/0239508 A1* | 8/2018 | Varadi ................. G06F 3/04842 |

* cited by examiner

100

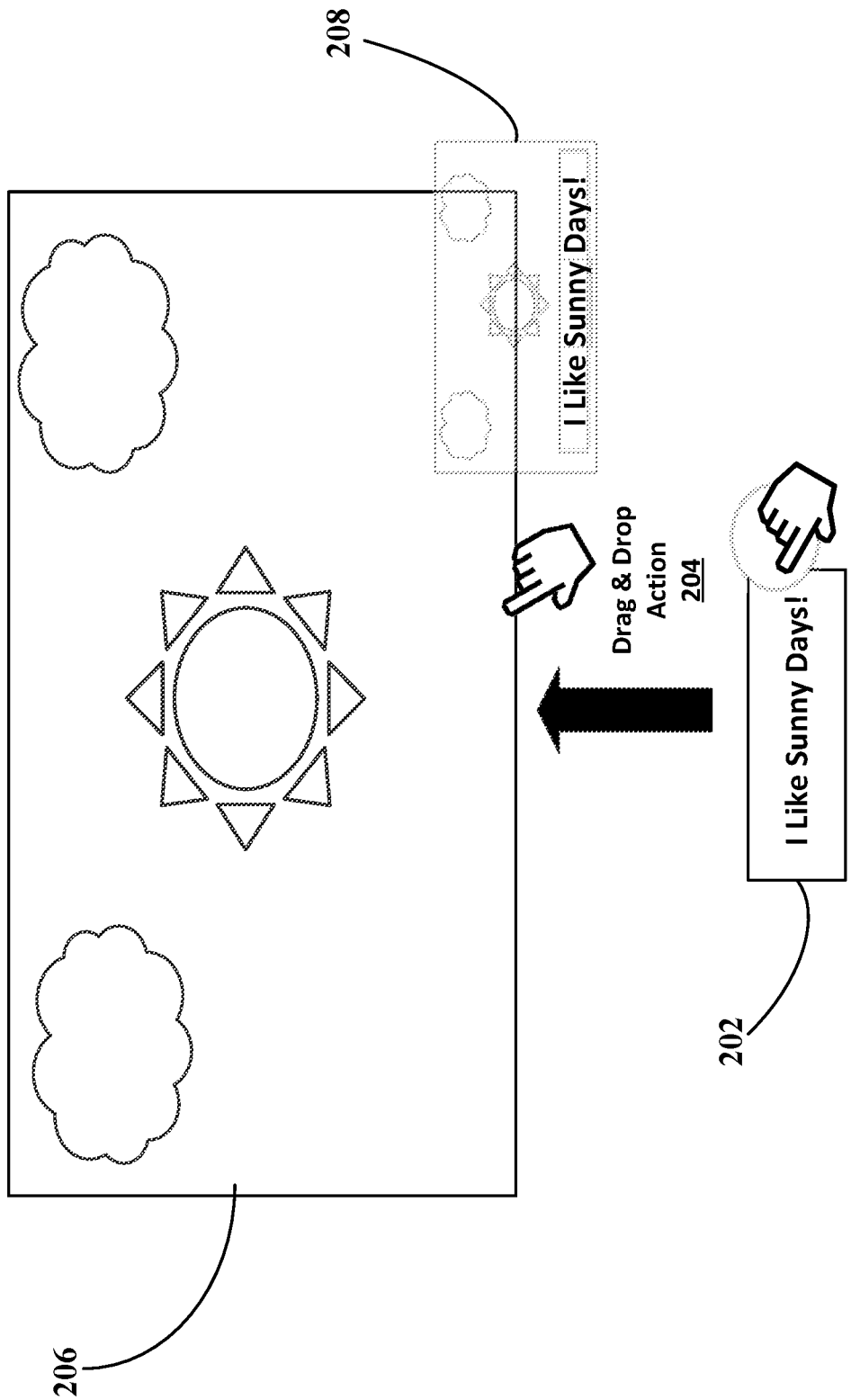

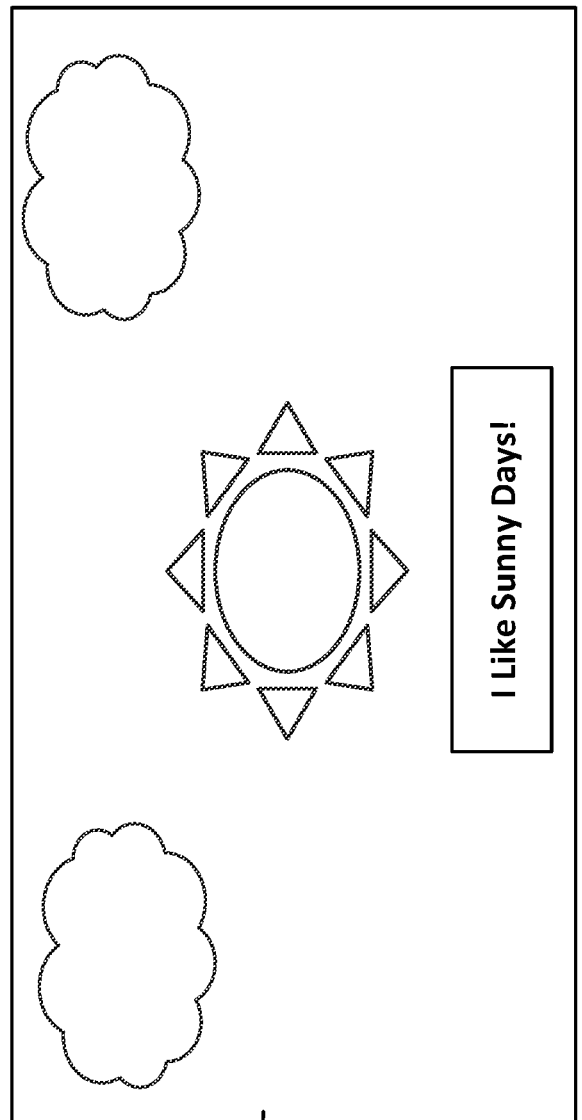

240

260

DRAG AND DROP OF OBJECTS TO CREATE NEW COMPOSITES

BACKGROUND

Typically, drag and drop operations may visually combine two data items but not actually group the data items together. For example, a user may drag and drop one item onto another item, creating the appearance of layering. However, each data item still remains an individual item that is unrelated to the other data item. If a user attempts to select items for re-positioning, sharing, etc., the user has to manually select each item of the layering in order to move layered items. This is inefficient from a processing standpoint as well as tedious for the user. Moreover, current applications/services do not analyze context associated with a drag and drop operations. Among other shortcomings, this limits an ability of the application/service to enhance a user experience (UX) for a user and also limits the user's interaction with a user interface of the application/service.

SUMMARY

Non-limiting examples of the present disclosure describe automatic creation of a composite data object from a received drag and drop action. A drag and drop action is received through a user interface of a productivity application/service. The drag and drop action comprises placing a first data object (or group of objects) onto a second data object (or group of objects). The drag and drop action is analyzed, where an analysis comprises: evaluation of attributes of the data objects, evaluation of a relationship between the data objects and a determination of user intent for the drag and drop action based on a placement of the first data object onto a position of the second data object. A group type is created that comprises an arrangement of the first data object and the second data object based on the analysis of the drag and drop action. In some examples, creation of a group type may comprise creating a plurality of group types representing different arrangements for placement of the first data object on the second data object based on the analysis of the drag and drop action. A representation of a composite data object is surfaced, through the user interface, based on the created group type. In examples where multiple group types are created, an exemplary productivity application/service may surface a plurality of different representations of the composite data object based on the plurality of group types that are created. For instance, this may enable a user to disambiguate between different options generated on behalf of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 2A-2G illustrate exemplary processing device views of an exemplary application/service that is configured to facilitate drag and drop actions with which aspects of the present disclosure may be practiced.

DETAILED DESCRIPTION

Figure 1:
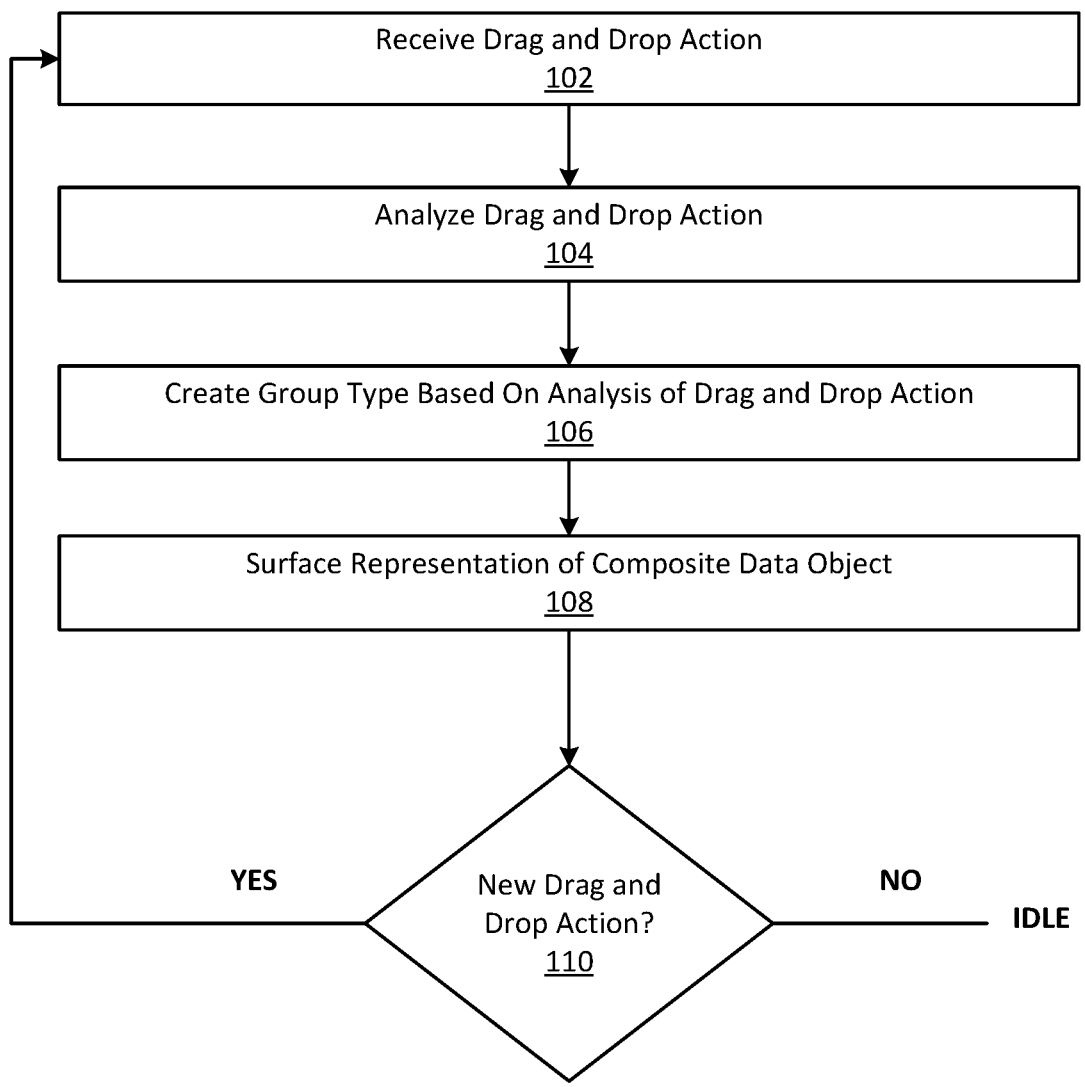
FIG. 1 illustrates an exemplary method related to processing operations for generation of composite data objects based on drag and drop actions with which aspects of the present disclosure may be practiced.

Non-limiting examples of the present disclosure describe automatic creation of a composite data object from a received drag and drop action. Dragging and dropping a data object (or objects) on another data object (or objects) results in new outcomes, which may be inferred based on analysis of the drag and drop action. For example, a drag and drop evaluation model may be configured to analyze attributes of the data objects (e.g. origin, file format, content, layout of content, formatting, time, place, theme, metadata, etc.), relationships (e.g. similarities, differences, presentation styles for merging the data objects including various arrangements for content of data objects, etc.) and user intent for the drag and drop action, among other examples. For instance, an exemplary drag and drop evaluation model may be configured to apply inference rules for generating inferences about the drag and drop action that are used to generate an exemplary composite data object that groups the data objects. An exemplary drag and drop evaluation model may be configured to work in an exemplary application/service or as a separate service that interfaces with an exemplary application/service.

In one example, a drag and drop action is received through a user interface of a productivity application/service. The drag and drop action comprises placing a first data object onto a second data object. The drag and drop action is analyzed, where an analysis comprises: evaluation of attributes of the data objects, evaluation of a relationship between the data objects and a determination of user intent for the drag and drop action based on a placement of the first data object onto a position of the second data object. A group type is created that comprises an arrangement of the first data object and the second data object based on the analysis of the drag and drop action. In some examples, creation of a group type may comprise creating a plurality of group types representing different arrangements for placement of the first data object on the second data object based on the analysis of the drag and drop action. A representation of a composite data object is surfaced, through the user interface, based on the created group type. In examples where multiple group types are created, an exemplary productivity application/service may surface a plurality of different representations of the composite data object based on the plurality of group types that are created. For instance, this may enable a user to disambiguate between different options generated on behalf of the user.

As an example, an exemplary representation of a composite data object comprises the first data object (or group of objects) overlaying the second data object (or group of objects) at a position on the second data object where the drag and drop action is received. In alternative examples, or more drop zones for placement of the first data object on the second data object may be presented based on one or more of: a hover action of the first data object over the second data object, a drag of an object over another object, a drop of an object onto another object and a completion of the drag and drop action. Exemplary drop zones may be presented for locational-based placement or intent-based actions. Drop zones for locational-based placement are user interface features that represent layout options that a user may pick for placement of an exemplary object. Drop zones for intent-based actions may be presented when a user drags an object over another object, where a set of direct representation outcomes may be displayed through a user interface. The user may then drag an object over a specific outcome (e.g. displayed representation) to execute a specific intent. Users may become familiar with exemplary drop zones based on interaction with an exemplary application/service. In some examples, a preview of the composite data object is surfaced (through a user interface of a productivity application/service), for example, based on a hover action of the first data object over the second data object prior to a completion of the drag and drop action. Exemplary drop zones and/or previews may be displayed, through a user interface, in any of the following manners: in-line with other content, overlaying content or as a callout. Further, such user interface features may be configured for user interaction.

Accordingly, the present disclosure provides a plurality of technical advantages including but not limited to: generation of a composite data object that groups data objects of a drag and drop operation. content mobility for composite data objects across different applications/services, improved processing efficiency (e.g. reduction in processing cycles, reduction in latency, better management of storage/memory of computing devices) for computing devices that are utilized for generating and managing content for drag and drop actions, generation and utilization of an exemplary drag and drop evaluation model, generation and application of inference rules for generating inferences about a drag and drop action and improved user interaction and productivity when using exemplary applications/services including an improved user interface for an application/service where the user interface is configured to enable functionality described herein, among other examples.

FIG. 1 illustrates an exemplary method 100 related to processing operations for processing operations for generation of composite data objects based on drag and drop actions with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where a drag and drop action is received through a user interface of a productivity application/service. The drag and drop action may comprise placing a first data object (or group of objects) onto a second data object (or group of objects). While a completion of a drag and drop action may be referenced in one example, other examples of processing operation 102 comprise those which initiate a drag and drop operation but are prior to completion of the drag and drop action. Any such example may trigger processing operations as described herein including activation of an exemplary drag and drop evaluation model as subsequently described. An exemplary drag and drop operation or complete action may be received through any type of input as known to one skilled in the field of art.

Examples described herein are configured to work with any type of application/service including productivity applications/services. One example of a productivity service is an authoring application/service. An exemplary authoring service may be used as an example in the foregoing description for ease of understanding. An exemplary authoring service (or application) is configured to enable users to create digital presentation documents. As an example, an exemplary authoring service is Microsoft® Sway®. In some examples, the authoring service may be a component of a suite of productivity applications/services that may be configured to interface with other applications/services associated with a platform. For example, the authoring service may be included in a bundled service (e.g. Microsoft® Office365® or the like). Further, an exemplary authoring service may be configured to interface with other internet sources/services including third-party application/services, for example, to enhance functionality of the authoring service.

The authoring service may be configured to enable users to create or edit digital presentation documents, for example, from existing digital content (including different electronic documents). For instance, an existing image file may be imported, where additional content can be added including but not limited to: headings, text, links, media content, etc. Digital presentation documents may comprise but are not limited to: slide-based presentations, websites, social networking posts, word documents, notes, documents, spreadsheet documents, blogs, etc. In alternate examples, digital presentation documents can be created from scratch, where users can generate new types of electronic content and incorporate the new types of digital content (and possibly with other existing digital content) into a digital presentation document. An exemplary authoring service is further configured to enable users to pull content locally (e.g. from a storage of a specific computing device) or retrieve content via a network connection (e.g. retrieve content from a distributed storage, website, etc.). Exemplary composite data objects may be automatically generated on behalf of the user based on receipt of drag and drop actions (complete or partial) related to data objects of the authoring service.

As an example, a user interface of Sway® is based around a storyline, into which users add a series of cards. An exemplary card is a digital representation for presentation of content, where cards are then filled with digital content. In examples, different cards are available for different types of digital content, and which can be grouped together. Digital content, intended to be the user's narrative can be easily added, removed, edited or reordered. As compared with other existing presentation services, functionality in Sway® provides a more free-flowing and user-friendly user interface, while also improving processing efficiency (e.g. reduction of computing cycles, resources, digital storage, etc.) needed to manage digital presentation documents.

As referenced above, processing operation 102 may comprise detecting completion of a drag and drop action may that comprises a user placing a first data object (or group of objects) onto a second data object (or group of objects). In another example of processing operation 102, a preview of an exemplary composite data object (grouping two or more data objects from a drag and drop operation or action) is generated and surfaced for a user through a user interface of an exemplary application/service. For instance, an exemplary preview may be surfaced, in real-time, based on a hover action of the first data object over the second data object prior to a completion of the drag and drop action. Other examples of actions that may initiate an exemplary preview may comprise but are not limited to: dragging an object over another object, dropping an object (e.g. onto another object), and completion of a drag and drop action. Exemplary previews may be displayed, through a user interface, in any of the following manners: in-line with other content, overlaying content or as a callout.

In other alternate examples of processing operation 102, or more drop zones for placement of the first data object on the second data object may be presented, through the user interface, based on one or more of: a hover action of the first data object over the second data object, a drag of an object over another object, a drop of an object onto another object and a completion of the drag and drop action. Exemplary drop zones may be presented for locational-based placement or intent-based actions. Drop zones for locational-based placement are user interface features that represent layout options that a user may pick for placement of an exemplary object. Drop zones for intent-based actions may be presented when a user drags an object over another object, where a set of direct representation outcomes may be displayed through a user interface. The user may then drag an object over a specific outcome (e.g. displayed representation) to execute a specific intent. Users may become familiar with exemplary drop zones based on interaction with an exemplary application/service. Exemplary drop zones may be displayed, through a user interface, in any of the following manners: in-line with other content, overlaying content or as a callout. Further, such user interface features may be configured for user interaction.

Flow of method 100 may proceed to processing operation 104, where the drag and drop action is analyzed. As referenced above an exemplary application/service may be configured to employ an exemplary drag and drop evaluation model to analyze a drag and drop action (e.g. partial or complete). The drag and drop evaluation model may be a software-based model, machine-learning model, neural network model, or the like. Types of data models and processing operations for generation and implementation of exemplary data models are known to one skilled in the art. For instance, an application programming interface (API) may be utilized to employ the drag and drop evaluation model through an application/service.

An exemplary drag and drop evaluation model is configured to analyze the drag and drop action and generate inferences based on an analysis of different aspects associated with the drag and drop action. An exemplary drag and drop model may be executed by a system that comprises one or more computing devices, for example, that may be any of a client-side computing device, a server-side computing device or a combination thereof. The drag and drop evaluation model may be configured to apply inference rules for generating inferences about the drag and drop action that are used to generate an exemplary composite data object that groups the data objects. For example, a drag and drop evaluation model may be configured to analyze attributes of the data objects (e.g. origin, file format, content, layout of content, formatting, time, place, theme, metadata, etc.). Further the drag and drop model may be further configured to evaluate relationships (e.g. similarities, differences, presentation styles for merging the data objects including various arrangements for content of data objects, etc.) between the data objects of the drag and drop action.

Moreover, the drag and drop evaluation model may be configured determine user intent for the drag and drop action. For instance, user intent may be inferred based on a placement of the first data object onto a position of the second data object. A determination of user intent may further comprise selecting the user intent based on an evaluation of data pertaining to previous user behavior for grouping of the first data object and the second data object. This may indicate patterns of user behavior, where patterns may be evaluated on an individual user level and/or aggregated to a group level (e.g. all users of an application/service). In examples, a determination of user intent may further comprise evaluation as to whether a drag and drop action (and/or additional actions by the user) corresponds to a special meaning. An exemplary application/service may be programmed to recognize user actions (including combinations of actions) as corresponding to a specific intent. For example, dragging a name on a photo that contains multiple people, and moving a cursor above a specific individual might prompt an offering to use that text as a tag or a title. In another example, dragging text over a group of images (showing individual people) and moving the text above one of the images might associate that text with that specific image and offer to use as a caption for that specific image.

An exemplary drag and drop evaluation model may be configured to identify types of data objects that are involved in a specific drag and drop action. Inference rules may be set for working with specific types of content/data objects. For instance, inference rules may vary based on the types of data objects involved in the drag and drop action. Specific examples of exemplary inference rules that may be applied by the drag and drop evaluation model are now described.

For example, when working with text data objects that are added to other types of data objects (e.g. images, videos, handwritten input, links, representation of audio files, etc.), salient region detection processing may be applied to recognize placement options for the text and select N or more positions for placement of the text data object over another data object. In one example, a highest ranked (e.g. estimated best position) may be automatically selected based on a comprehensive analysis of the different attributes associated with a drag and drop action. In another example, an inference may be made to add a text data object as a caption under or on the side of another type of data object (e.g. image). In another example, an inference may be generated to place the text data object as a title (in any of a variety of positions) for placement over another type of data object.

In another example, inference rules may be generated and applied that evaluate a relationship between data objects. For instance, an inference rule may be set that determines whether objects are homogenic, and may propose a layout that express that by retaining uniformity and tight grouping. In other examples, inference rules may be set to emphasize distinguishing features of different data objects. In another example, inference rules may be set to evaluate time and theme of different data objects. For instance, when data objects express progression over time, an inference may be generated that comprises a propose layout that express progression. Alternatively, when data objects (e.g. images) express two states of the same object, an inference may be generated to propose a layout that enables a comparison layout. When data objects (e.g. images) are completing a scenery sequence (i.e. their edges can be stitched to a panorama), an inference may be generated to propose a panorama view for the data objects.

Moreover, inference rules may be set that evaluate locational placement of data objects, for example, coordinates pertaining to size and positioning of specific data objects. In one example, X-Y data is used to capture location of a data object, where such captured information is further utilized to generate inferences proposing relevant visualization/layout for a data object (e.g. relative to another data object). Repeating X-Y data locations may further be used to indicate magnitude. Combining this info with additional info (time, facial recognition, objects relationship, would result in other proposed outputs that may affect a representation of a new composite data object.

Furthermore, inference rules may be set to evaluate data objects that relate to image content. For instance, an inference rule may be applied for combining image data objects, where if the system (executing the drag and drop evaluation model) recognizes that one of the images can be a background, and another could be a foreground, an inference may be generated to offer an overlaid composition when grouping multiple images objects. In further examples, inference rules may be set to identify that an image data object is an outlier and provide that image data object a different treatment (size, decoration, color, etc.). In further examples, inference rules may be applied that generate inferences to compare image data objects, arrange image data objects in a presentation format (e.g. slideshow presentation) or grid display format, stack image objects and automatically align image data objects (e.g. inline, in a row, column, etc.), among other examples.

In other examples, inference rules may extend to working with table data objects. For instance, when a user combines a data object such as an image with a table data object, an exemplary drag and drop evaluation model may be configured to: add the image as a header for table, add the image as a background to the table, add an image as an item in the table if the image relates to one of the items in the table, add the image as an item in a column/row, among other examples. In another instance, if an image relates to another type of data object within a table, the drag and drop evaluation model may be configured to: adds another item to the table, convert the image to text, and try to auto fill the missing information based on analysis. The drag and drop evaluation model may be configured to interface with other resources (e.g. applications/services such as search services, databases, knowledge repositories, etc.) to complete data, generate suggestions for content, etc.

In another example, exemplary inference rules may be set to work with different types of content such as geographic maps. For instance, if a data object is dragged onto a representation of a geographic map, a composite data object may be generated that positions that data object at a specific location on the geographic map. When a group of photos (having similar global positioning metadata and/or timestamp data) is grouped with a map that matches, the drag and drop evaluation model may propose that the photos are placed on those coordinates on the map to create an interactive presentation.

In examples where data objects are identified to have numbers of items, grouping, sections, etc., inference rules may be applied to evaluate such characteristics of the data objects. For example, an inference rule may be generated that identified that a number of items (e.g. bullets) in one object matches the number of items in another object or a group of objects (e.g. pictures). This may yield an inference that proposes to use the initial item in a meaningful way, like as labels, captions, or associated text, for the second item. In another example, when a data object contains a list of dates, the drag and drop evaluation model may be configured to propose timeline layout for the data objects. Timestamp data may be utilized to infer relationship between data objects. In one example, an inference rule may be set that identifies f the number of date is the same as of the number of data objects to associate the data objects to a specific position (e.g. date) in a timeline layout.

Further, as referenced above, the drag and drop evaluation model may be configured to interface with other application/services, for example, to extend functionality of the drag and drop evaluation model for generation of meaningful composite data objects. For example, an inference rule may be set that identifies when a data object contains names is dropped on an object that shows people faces, places, or similar recognizable objects. As an example, an inference may be generated that attempts to auto associate the names to the faces, and indicate to the user if there was a match, and which names and faces were not a match. Recognition processing by application/services is known to one skilled in the art. As referenced above, rules may be configured to determine user intent (including evaluation of special meaning of user action such as a drag and drop action).

Other types of inference rules may relate to grouping of rich data objects such as video data objects, audio data objects, links, etc. In one example, an inference rule may be generated that where adding audio to video text of a video data object triggers adding of audio annotation to the video. For instance, the drag and drop evaluation model may be configured to detect a salient region that could be used for optional positioning of the audio data object within the video data object. In another example, when a video data object is grouped with a text data object, an exemplary drag and drop evaluation model may be configured to make the text the caption. Another example of an inference rule may be adding of a text data object with a time stamp to a video data object triggers the text data object to be added as a close caption during playback of the video data object. In another example, a drag and drop of an audio data object onto a video data object may trigger automatic playback of the audio data object when the image data object is displayed (or selected during display).

In another example, an inference rule may be set to identify a unified theme related to grouped content, where an exemplary inference is generated for suggesting additional related content. In another instance, recognition of a unified theme for a group of data objects (or a potential merging between data objects based on the drag and drop action) may comprise suggesting additional related content (e.g. data objects) to include in a grouping of data objects. In another example, recognition of a unified theme for a group of data objects may comprise proposing a label, text object, header/footer, etc. for the group of data objects.

Further, inference rules may also be set to evaluate conflicts in information between data objects. In some examples, the drag and drop evaluation model may be configured to automatically resolve data conflicts and in other examples a manual resolution prompt may be surfaced for the user to disambiguate.

Flow of method 100 may proceed to processing operation 106, where one or more group types for data objects of the drag and drop action are created. Group types may be created from inferences generated by analysis of the drag and drop action by the drag and drop evaluation model. For example, different group types may comprise but are not limited to: an overlaid layout (e.g. presenting a first data object over a second data object), embedded layout (where a data object is embedded within another data object), panorama viewing layout, comparison layout, unified grid layout, liquid layout and stack layout progression/timeline layout, among other examples. In one example, a group type is created that comprises an arrangement of the first data object and the second data object based on the analysis of the drag and drop action. In another example, a group type may be created when one data object is added to an existing grouping of a plurality of data objects (e.g. stack of image data objects). In some examples, processing operation 106 may comprise creation of a plurality of group types representing different arrangements for placement of data objects involved in the drag and drop action. Generated inferences used to create a group type that is best suited to the properties of the grouped items. Further, exemplary group types may comprise optimized positioning of a data object in association with another data object, for example, based on the inferences generated by the drag and drop evaluation model.

At processing operation 108, one or more representation of an exemplary composite data object may be surfaced through a user interface of an application/service. As an example, an exemplary representation of a composite data object comprises a first data object overlaying a second data object at a position on the second data object where the drag and drop action is received. A representation of a composite data object may be surfaced (processing operation 108) based on a created group type (or group types). In examples where multiple group types are created, an exemplary productivity application/service may surface a plurality of different representations of the composite data object based on the plurality of group types that are created. For instance, this may enable a user to disambiguate between different options generated on behalf of the user. In such an example, a user may select a specific representation of a composite data object to utilize within an exemplary application/service. In examples where an exemplary drop zone was selected for placement of one or more data objects, an exemplary representation may correspond with a UI selection of a specific drop zone.

Moreover, a referenced above, inference rules may be applied that determine whether to provide suggestions of additional content/data objects to add to a representation of a composite data object. In other examples, user interface prompts may be surfaced in association with a representation of a composite data object, for example, so a user can share a representation of a composite data object, automatically incorporate a composite data object within another application/service (e.g. cross-application usage), edit the composite data object, etc.

Flow may proceed to decision operation 110, where it is determined whether a new drag and drop action (partial or complete) is received. For instance, a user may wish to add another data object to a composite data object or create a new grouping of data objects. If no additional drag and drop action is received, flow of decision operation 110 branches NO and processing of method 100 remains idle until subsequent action is received. If an additional drag and drop action is received, flow of decision operation 110 branches YES and processing of method 100 returns to processing operation 102.

FIGS. 2A-2G illustrate exemplary processing device views of an exemplary application/service that is configured to facilitate drag and drop actions with which aspects of the present disclosure may be practiced. Processing flow 200 illustrates drag and drop action examples and results presented through a user interface of an application/service. Processing operations supporting the examples shown in FIGS. 2A-2G are described in the foregoing description of method 100 (FIG. 1).

FIG. 2A illustrate processing device view 200 highlighting an example of a drag and drop action within an exemplary application/service. For example, a first data object 202 (e.g. text object "I Like Sunny Days!") is being dragged and dropped (via a drag and drop action 204) onto a second data object 206 (e.g. image content with sun and clouds). In one example, a user interface feature such as preview 208 is automatically displayed to provide a user with a preview of what a new composite data object may look like, for example, the first data object 202 overlaying the second data object 206 based on a locational position of the drag and drop action 204.

Figure 2B:
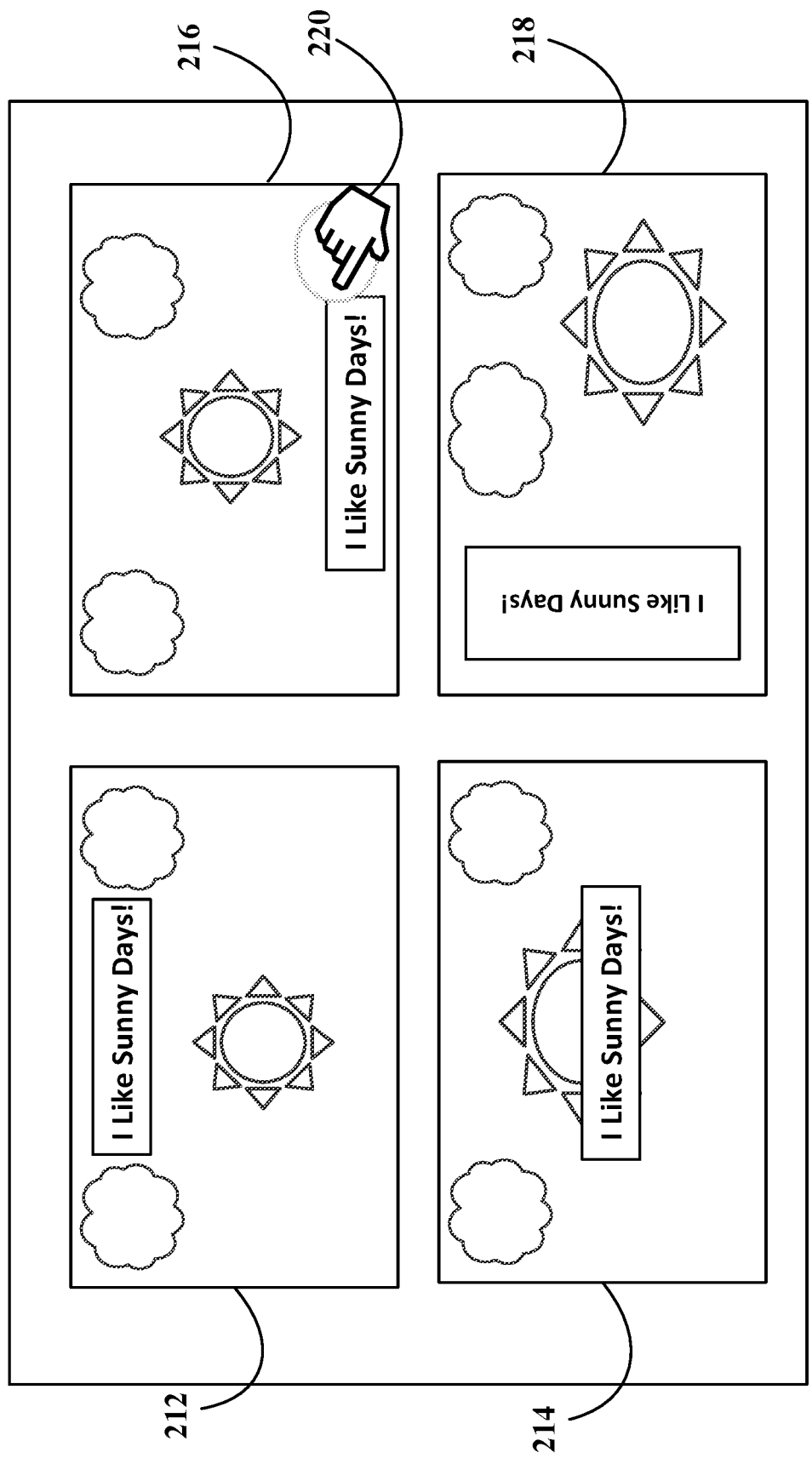

FIG. 2B illustrates processing device view 210 providing an alternative result of a drag and drop action within an exemplary application/service. As an example, a plurality of representations of a composite data object 212-218 may be presented for a user to select from or disambiguate between. The plurality of representations of a composite data object 212-218 may be generated from inferences determined based on analysis of the drag and drop action 204 (and data objects included therewith), for example, by an exemplary drag and drop evaluation model. Furthermore, processing device view 210 illustrates an example where a representation of a composite data object 216 is selected by a user interface interaction 220.

FIG. 2C illustrate processing device view 230 providing an exemplary representation of a composite data object 232 being displayed through a user interface of an application/service. For instance, an exemplary representation of a composite data object 232 may be displayed based on the drag and drop action 204 (illustrated in processing device view 200) or user interface interaction 220 selecting a specific representation of a composite data object (illustrated in processing device view 210).

Figure 2D:
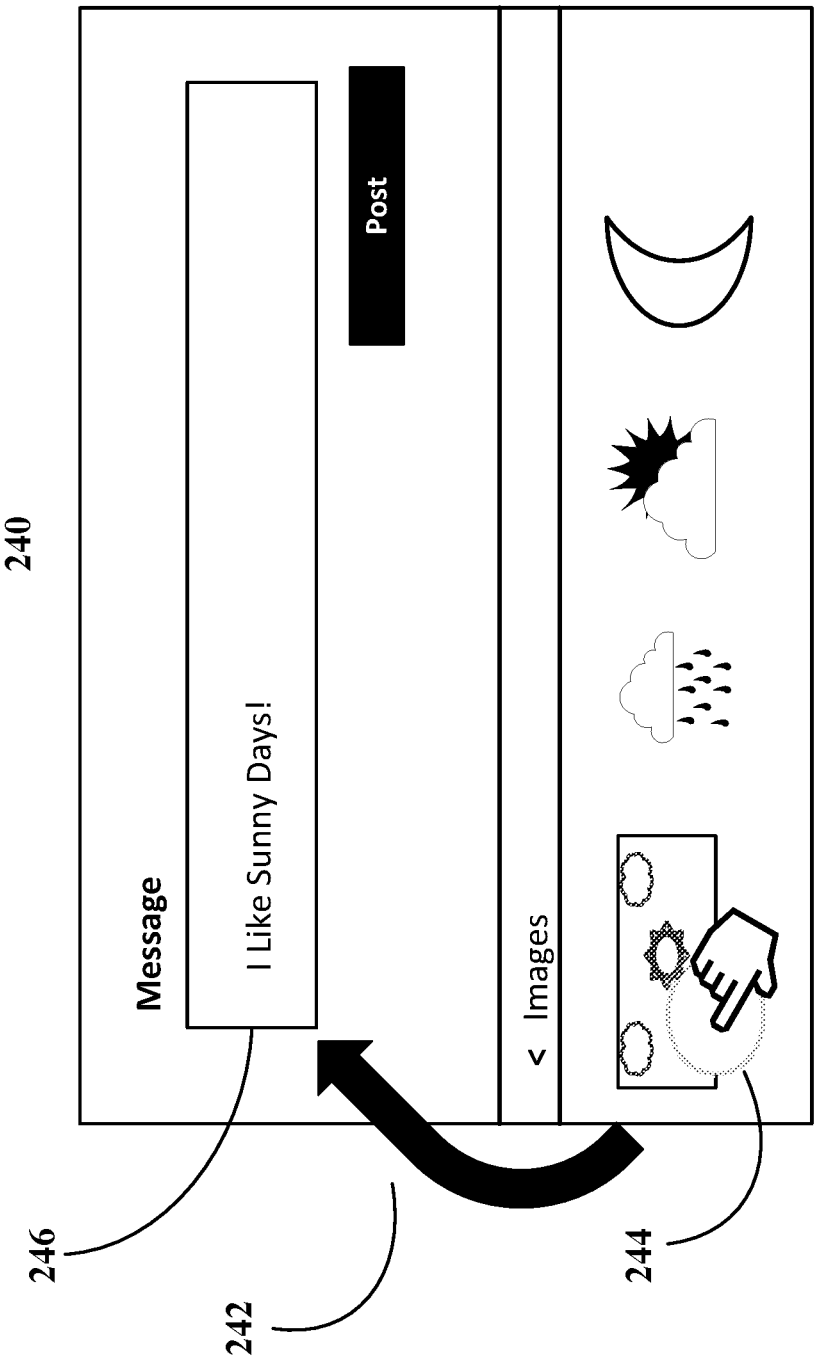

FIG. 2D illustrate processing device view 240 providing an example of a drag and drop action 242 adding a first data object 244 (e.g. image data object) to a text data object 246 (e.g. message, "I Like Sunny Days!"). Processing device view 240 illustrates that functionality described herein may be incorporated into any of a plurality of applications/services, including messaging applications/services.

Figure 2E:
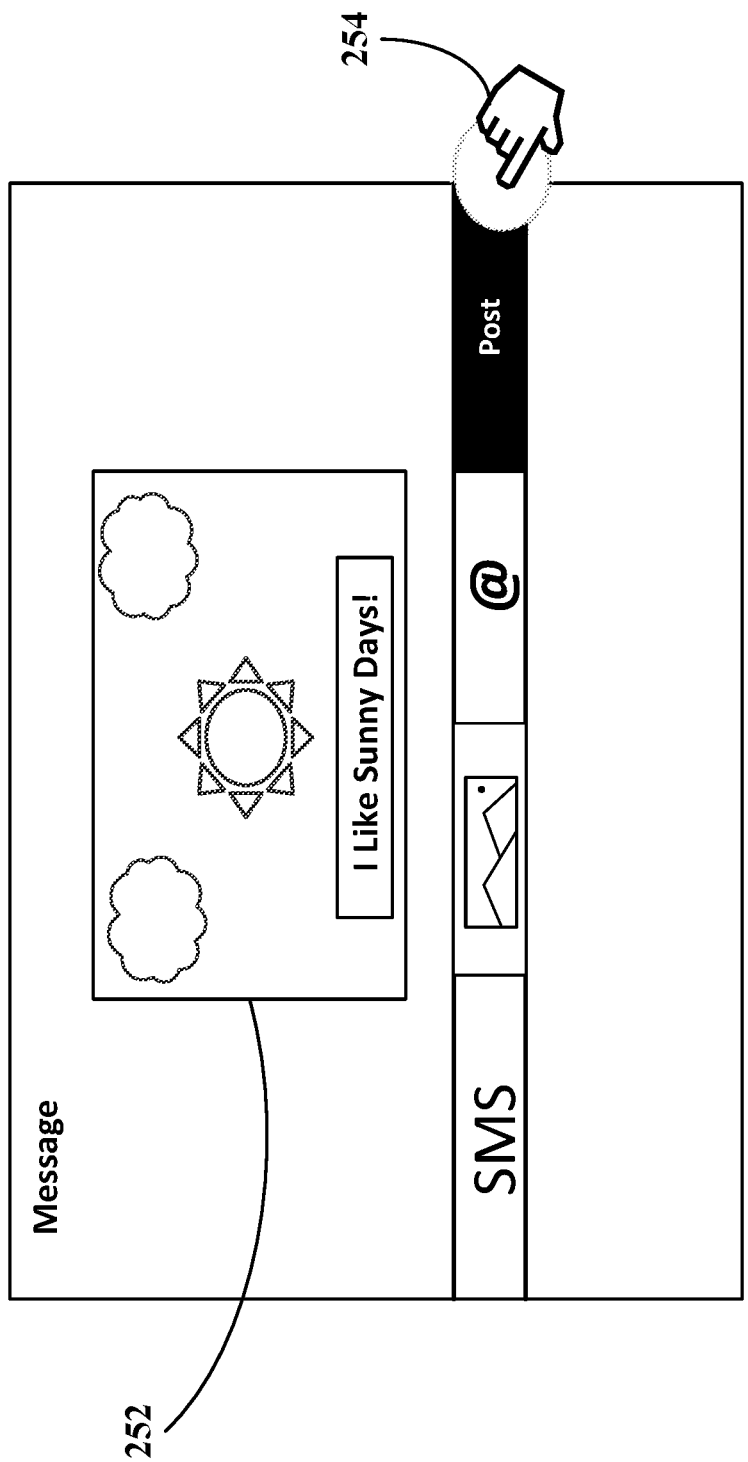

FIG. 2E illustrate processing device view 250 providing an exemplary representation of a composite data object 252 being displayed through a user interface of a messaging application/service. For example, the representation of the composite data object 252 may be created and surfaced based on drag and drop action 242 (illustrated in processing device view 240). Processing device view 250 further illustrates subsequent action being taken through a user interface of the messaging service, for example, where a user selects a user interface feature 254 for posting the composite data object 252, for example, to a digital message board, digital wall, etc.

Figure 2F:
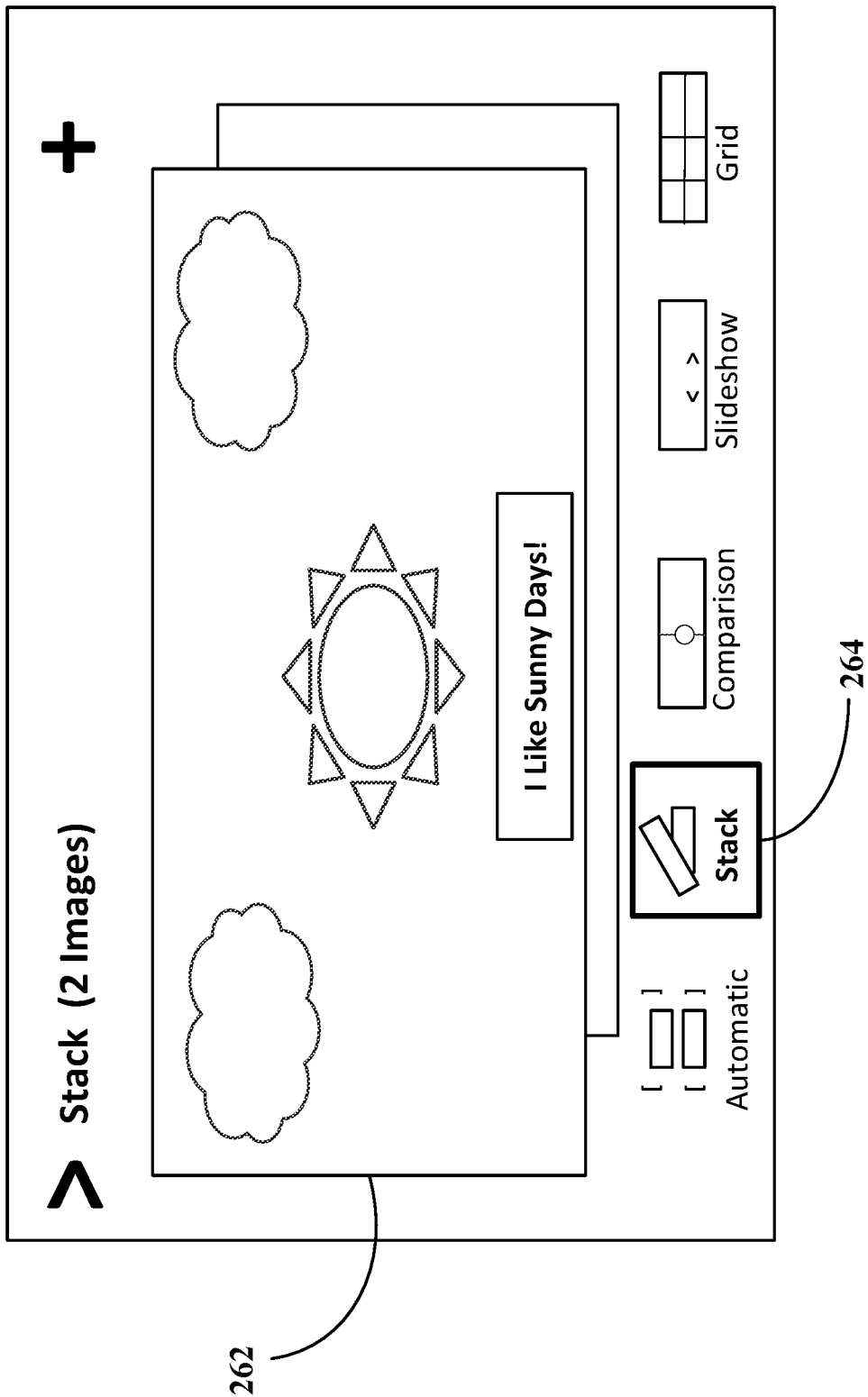

FIG. 2F illustrate processing device view 260 providing an exemplary representation of a composite data object based on an inference that creates an exemplary group type (as described in the description of method 100; FIG. 1). As described in the foregoing, inferences may be generated (by an exemplary drag and drop evaluation model) that may cause an application/service to align content in a specific formatting/layout based on generated inferences from analyzing a drag and drop action. In the example shown, a first image object may be dragged onto a second image object, where an inference may be generated that causes the representation of the composite data object to be grouped in a stack layout format 262 (e.g. one image data object on top of a second data image data object, with partial visibility of the second data object). As can be seen in processing device view 260, a user interface feature 264 highlights that the composite data object is being presented in the stack layout format 262. Other representation of the composite data object may be generated (based on alternative group types), where a user can utilize the user interface to navigate between the different representations. For instance, alternative examples for displaying a representation of a composite data object 262 may comprise but are not limited to: a comparison layout view between the two image objects of the composite data object 262, a slideshow layout of the two image objects, a grid layout the two image objects (e.g. as shown in FIG. 2G) and an automatic layout (aligning the two image objects in a specific formatting).

Figure 2G:
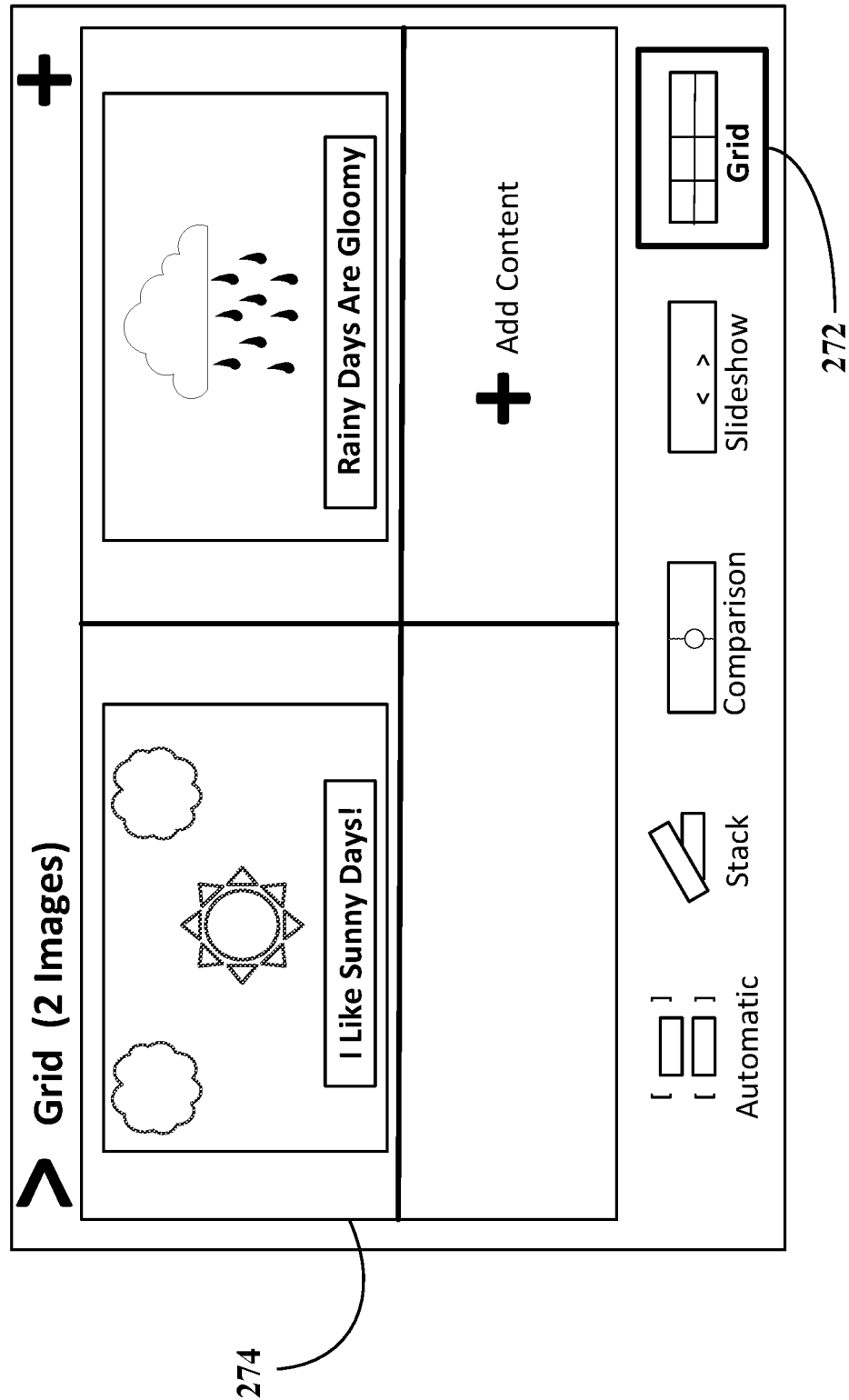

FIG. 2G illustrate processing device view 270 providing an exemplary representation of a composite data object based on an inference that creates an exemplary group type (as described in the description of method 100; FIG. 1). Processing device view 270 illustrates an alternative representation of a composite data object as compared to that shown in processing device view 260. As can be seen in processing device view 270, a user interface feature 272 highlights that the composite data object is being presented in a grid layout format 274. The grid layout format 274 provides a visual depiction of grouped data objects (of an exemplary composite data object) broken out into grid form. In the example shown, a user may elect to add additional content to the composite data object. The user interface is adapted to enable a user to easily and efficiently switch between different representations of a composite data object to obtain various levels of understanding. Additionally, a user interface on an exemplary application/service may be configured with additional user interface features for managing exemplary composite data objects.

In other examples, composite groupings of objects may be managed through a user interface of an exemplary application/service. For instance, composite groups may be represented to show any and all objects in a group in equal fashion. In some cases, a user may not be aware that a composite object comprises multiple different objects. An exemplary user interface may be configured to highlight (e.g. through callout, in-line, etc.) objects within a composite object, for example, when a user selects the composite object, executes a hover action over a composite object, views a preview, etc.

Figure 3:
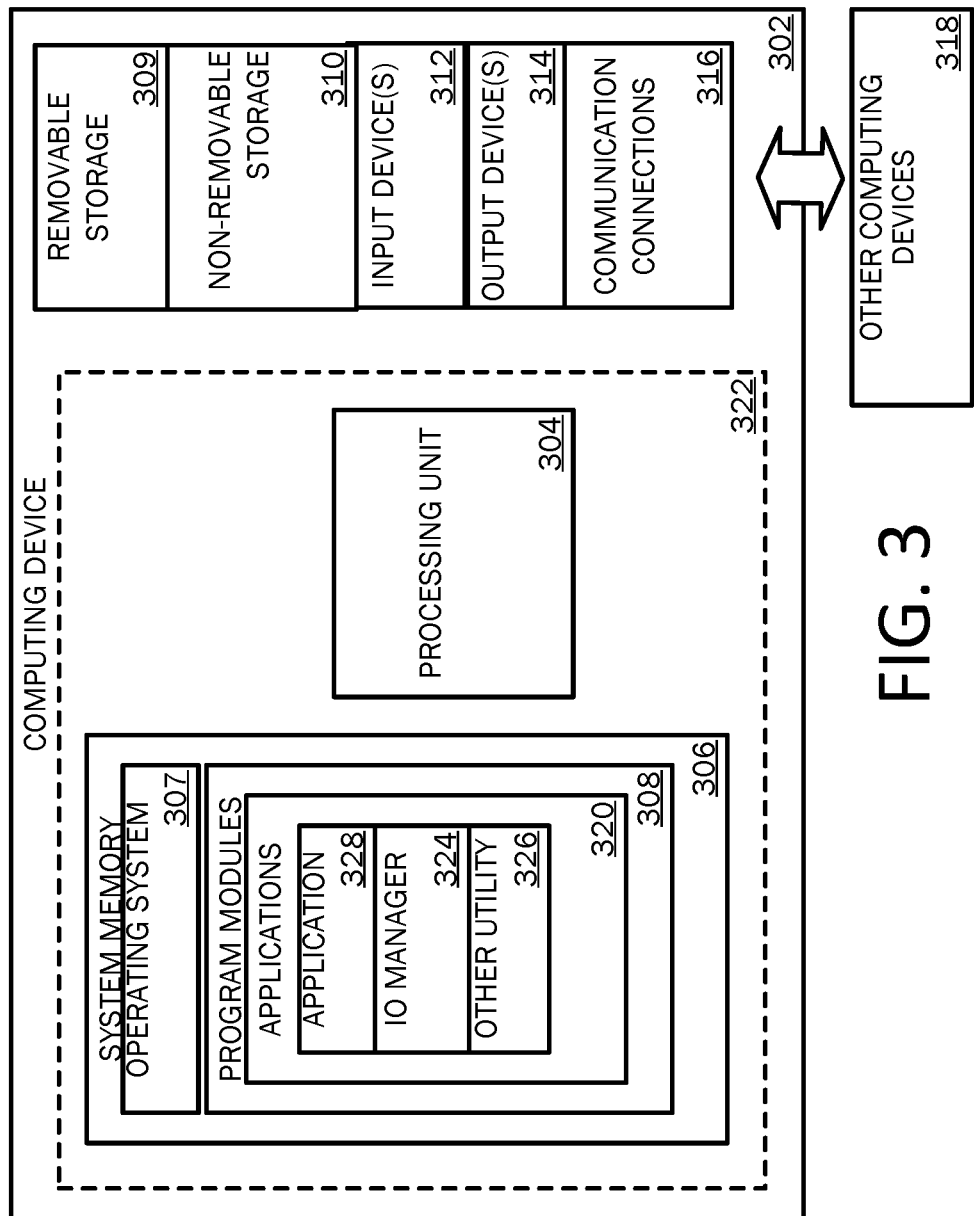
FIG. 3 is a block diagram illustrating an example of a computing device with which aspects of the present disclosure may be practiced.
Figure 4A:
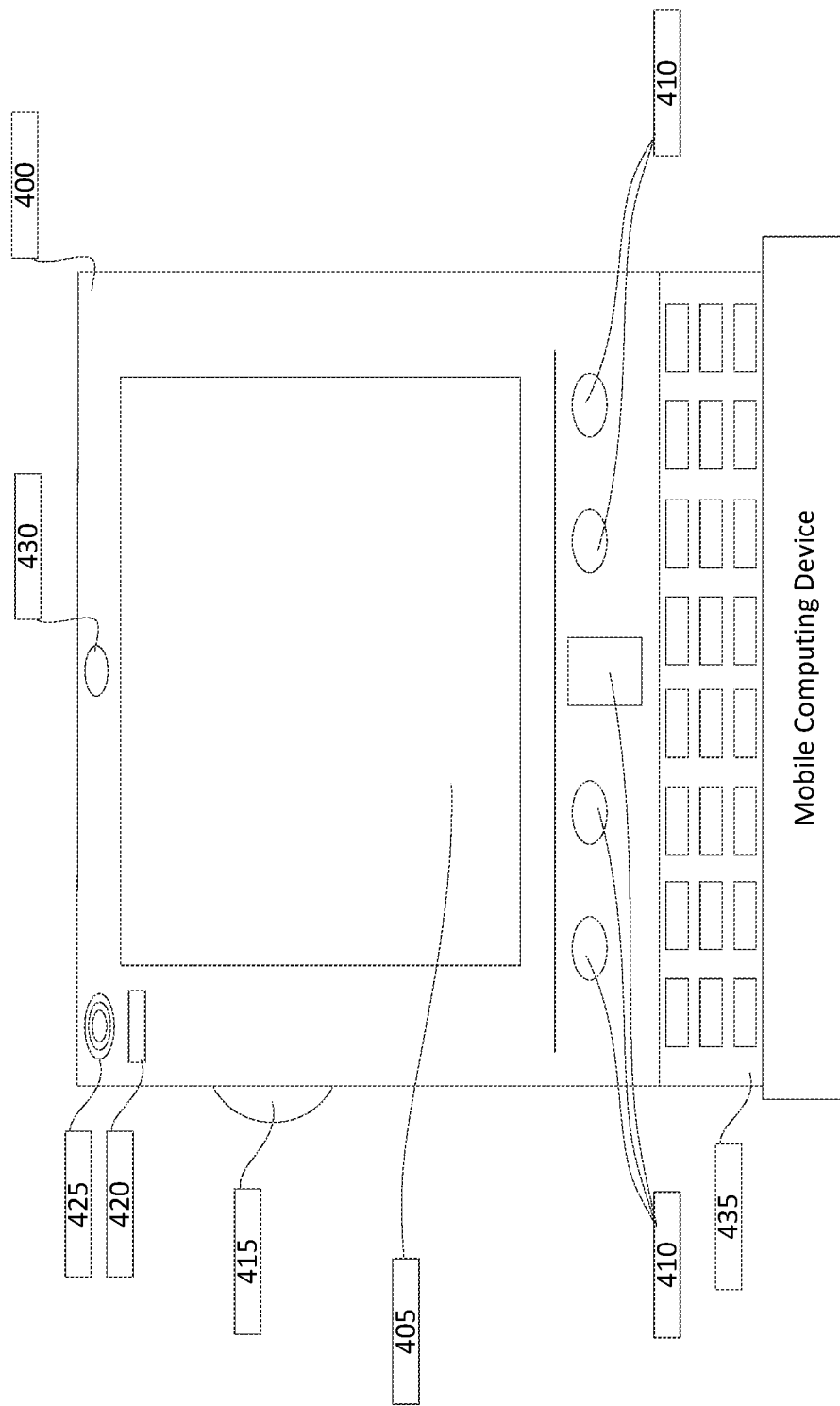
FIGS. 4A and 4B are simplified block diagrams of a mobile computing device with which aspects of the present disclosure may be practiced.
Figure 4B:
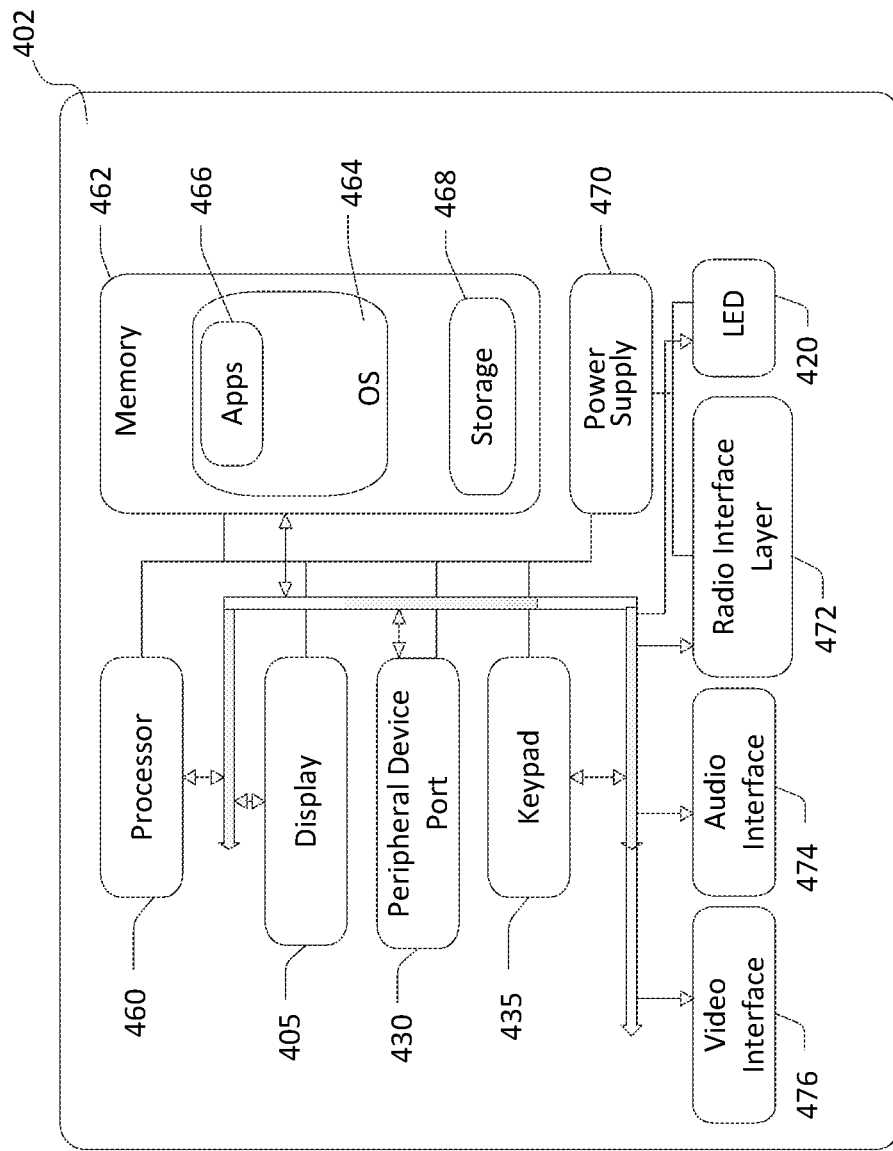
Figure 5:
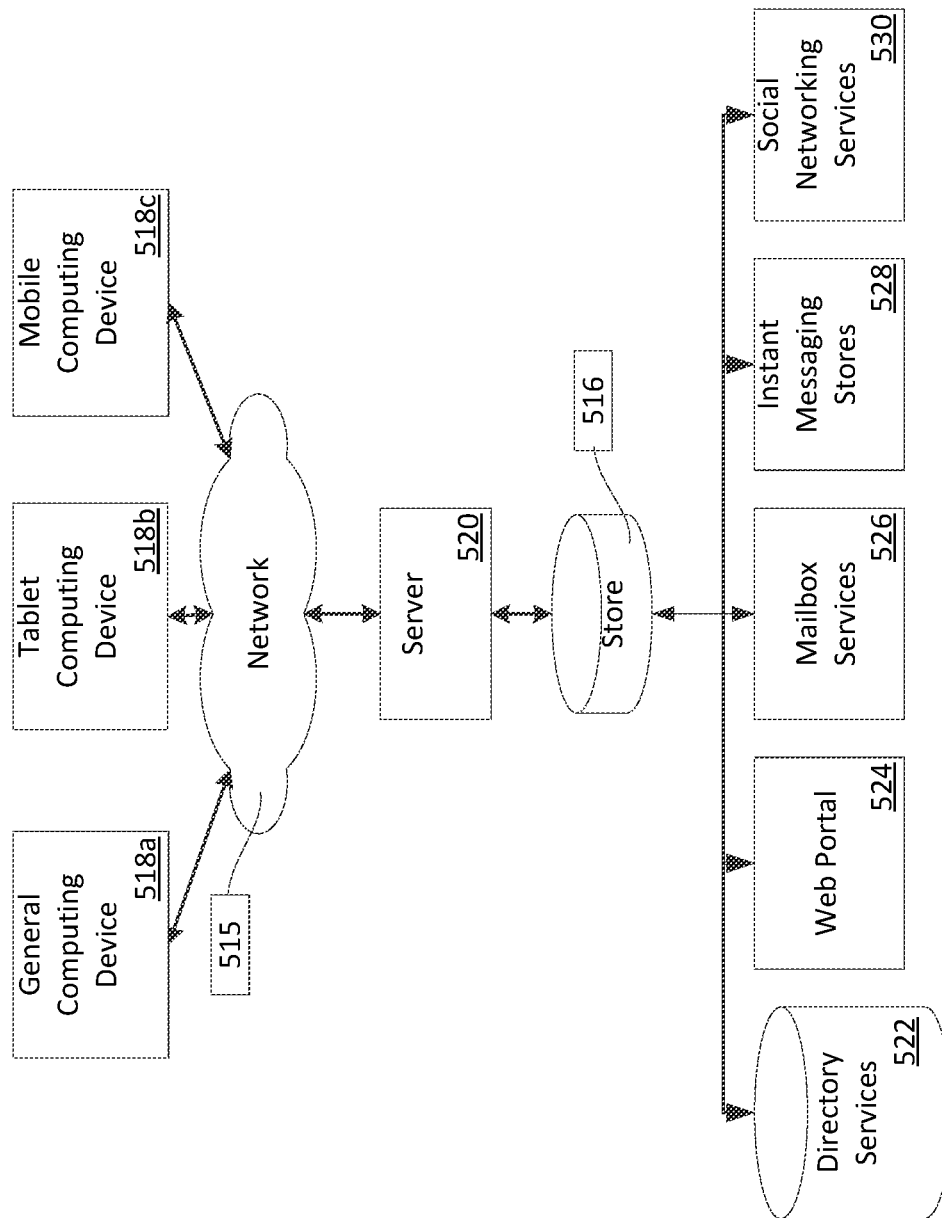
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for generation and management of composite data objects based on drag and drop actions as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured generation and management of composite data objects based on drag and drop actions as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for generation and management of composite data objects based on drag and drop actions as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A method comprising:
  receiving, through a user interface of a productivity service, a drag and drop action that places a first data object onto a second data object;
  analyzing, using a computing device, the drag and drop action, wherein an analysis of the drag and drop action comprises applying a drag and drop evaluation data model that is configured to execute operations that comprise:
  evaluating attributes of the first data object and the second data object,
  evaluating a relationship between the first data object and the second data object,
  determining a user intent for the drag and drop action based on a placement of the first data object onto a position of the second data object, and
  selecting inference rules to apply for determining a group type for the drag and drop action based on the evaluated attributes and the evaluated relationship between the first data object and the second data object and the determined user intent for the drag and drop operation;
creating, using the computing device, the group type that comprises an arrangement of the first data object and the second data object based on the inference rules selected from the analysis of the drag and drop action; and
surfacing, through the user interface executing on the computing device, a representation of a composite data object based on the created group type.

2. The method of claim 1, wherein the creating of the group type further comprises creating a plurality of group types representing different arrangements for placement of the first data object onto the second data object, and wherein the surfacing surfaces a plurality of different representations of the composite data object based on the plurality of group types that are created.

3. The method of claim 2, further comprising: receiving a selection of the representation of the composite data object from the plurality of different representations of the composite data object, and wherein the surfacing surfaces the representation of the composite data object based on the selection.

4. The method of claim 1, wherein the determining of the user intent for the drag and drop action comprises selecting the user intent based on an evaluation of data pertaining to previous user behavior for grouping of the first data object and the second data object, and wherein the data pertaining to previous user behavior comprises data for one or more selected from a group consisting of: a user of the productivity service and a plurality of users of the productivity service.

5. The method of claim 1, further comprising: surfacing a preview of the composite data object based on one or more selected from a group consisting of: a hover action of the first data object over the second data object prior to a completion of the drag and drop action, a drag action over the second object, and an action dropping the first object onto the second object.

6. The method of claim 1, wherein the representation of the composite data object comprises the first data object overlaying the second data object at a position on the second data object where the drag and drop action is received.

7. The method of claim 1, further comprising, presenting, through the user interface, one or more drop zones for placement of the first data object on the second data object based one or more selected from a group consisting of: a hover action of the first data object over the second data object and a completion of the drag and drop action.

8. A system comprising:
at least one processor; and
a memory, operatively connected with the at least one processor, storing computer-executable instructions that, when executed by the at least one processor, causes the at least one processor to execute a method that comprises:
  receiving a drag and drop action that places a first data object onto a second data object;
  analyzing, using the at least one processor of the system, the drag and drop action, wherein an analysis of the drag and drop action comprises applying a drag and drop evaluation data model that is configured to execute operations that comprise:
    evaluating attributes of the first data object and the second data object,
    evaluating a relationship between the first data object and the second data object,
    determining a user intent for the drag and drop action based on a placement of the first data object onto a position of the second data object, and
    selecting inference rules to apply for determining a group type for the drag and drop action based on the evaluated attributes and the evaluated relationship between the first data object and the second data object and the determined user intent for the drag and drop operation;
  creating, using the at least one processor of the system, the group type that comprises an arrangement of the first data object and the second data object based on the inference rules selected from the analysis of the drag and drop action; and
  transmitting for rendering a representation of a composite data object based on the created group type.

9. The system of claim 8, wherein the creating of the group type further comprises creating a plurality of group types representing different arrangements for placement of the first data object onto the second data object, and wherein the the creating creates a plurality of different representations of the composite data object based on the plurality of group types that are created.

10. The system of claim 9, wherein the method, executed by the at least one processor, further comprises: receiving an indication of a selection of the representation of the composite data object from the plurality of different representations of the composite data object, and wherein the transmitting transmits the representation of the composite data object based on the received indication.

11. The system of claim 8, wherein the determining of the user intent for the drag and drop action comprises selecting the user intent based on an evaluation of data pertaining to previous user behavior for grouping of the first data object and the second data object, and wherein the data pertaining to previous user behavior comprises data for one or more selected from a group consisting of: a user of the productivity service and a plurality of users of the productivity service.

12. The system of claim 8, wherein the method, executed by the at least one processor, further comprises: transmitting data for generating a preview of the composite data object for display based on one or more selected from a group consisting of: an indication of a received hover action of the first data object over the second data object prior to a completion of the drag and drop action, an indication of a drag action over the second object, and an indication of an action dropping the first object onto the second object.

13. The system of claim 8, wherein the representation of the composite data object comprises the first data object overlaying the second data object at a position on the second data object where the drag and drop action is received.

14. The system of claim 8, wherein the method, executed by the at least one processor, further comprises: transmitting, for display, data associated with one or more drop zones for placement of the first data object on the second data object based one or more selected from a group consisting of: a hover action of the first data object over the second data object and a completion of the drag and drop action.

15. A computer storage device storing computer-executable instructions that, when executed by at least one processor, causes the at least one processor to execute a method comprising:
receiving a drag and drop action that places a first data object onto a second data object;
analyzing, using the at least one processor, the drag and drop action, wherein an analysis of the drag and drop action comprises applying a drag and drop evaluation data model that is configured to execute operations that comprise:
evaluating attributes of the first data object and the second data object,
evaluating a relationship between the first data object and the second data object,
determining a user intent for the drag and drop action based on a placement of the first data object onto a position of the second data object, and
selecting inference rules to apply for determining a group type for the drag and drop action based on the evaluated attributes and the evaluated relationship between the first data object and the second data object and the determined user intent for the drag and drop operation;
creating, using the at least one processor, the group type that comprises an arrangement of the first data object and the second data object based on the inference rules selected from the analysis of the drag and drop action; and
transmitting for rendering a representation of a composite data object based on the created group type.

16. The computer storage device of claim 15, wherein the creating of the group type further comprises creating a plurality of group types representing different arrangements for placement of the first data object onto the second data object, and wherein the the creating creates a plurality of different representations of the composite data object based on the plurality of group types that are created.

17. The computer storage device of claim 15, wherein the determining of the user intent for the drag and drop action comprises selecting the user intent based on an evaluation of data pertaining to previous user behavior for grouping of the first data object and the second data object, and wherein the data pertaining to previous user behavior comprises data for one or more selected from a group consisting of: a user of the productivity service and a plurality of users of the productivity service.

18. The computer storage device of claim 15, wherein the executed method further comprising: transmitting data for generating a preview of the composite data object for display based on one or more selected from a group consisting of: an indication of a received hover action of the first data object over the second data object prior to a completion of the drag and drop action, an indication of a drag action over the second object, and an indication of an action dropping the first object onto the second object.

19. The computer storage device of claim 15, wherein the representation of the composite data object comprises the first data object overlaying the second data object at a position on the second data object where the drag and drop action is received.

20. The computer storage device of claim 15, wherein the executed method further comprising, transmitting, for display, data associated with one or more drop zones for placement of the first data object on the second data object based one or more selected from a group consisting of: a hover action of the first data object over the second data object and a completion of the drag and drop action.

* * * * *